C. W. CONGER.
PATTERN MACHINE.
APPLICATION FILED JAN. 30, 1911.
1,013,130.
Patented Jan. 2, 1912.
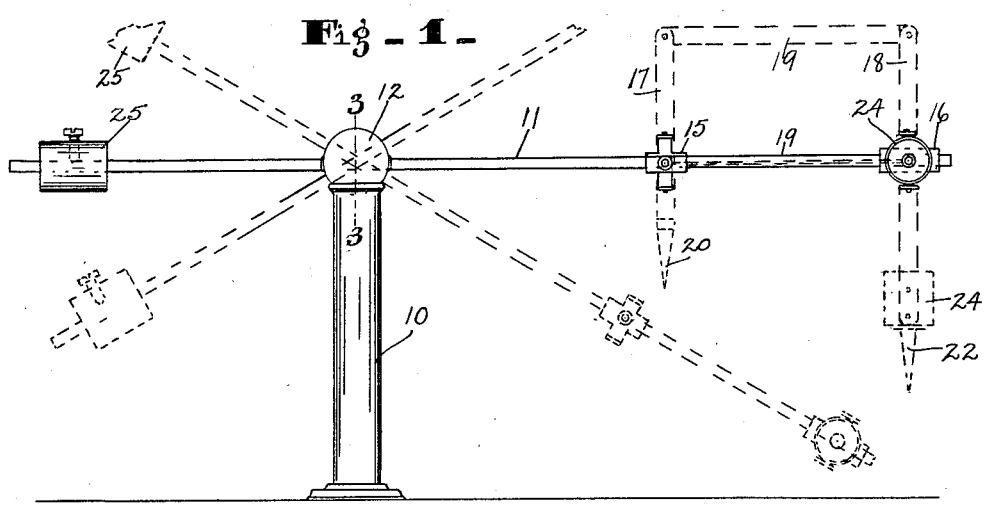
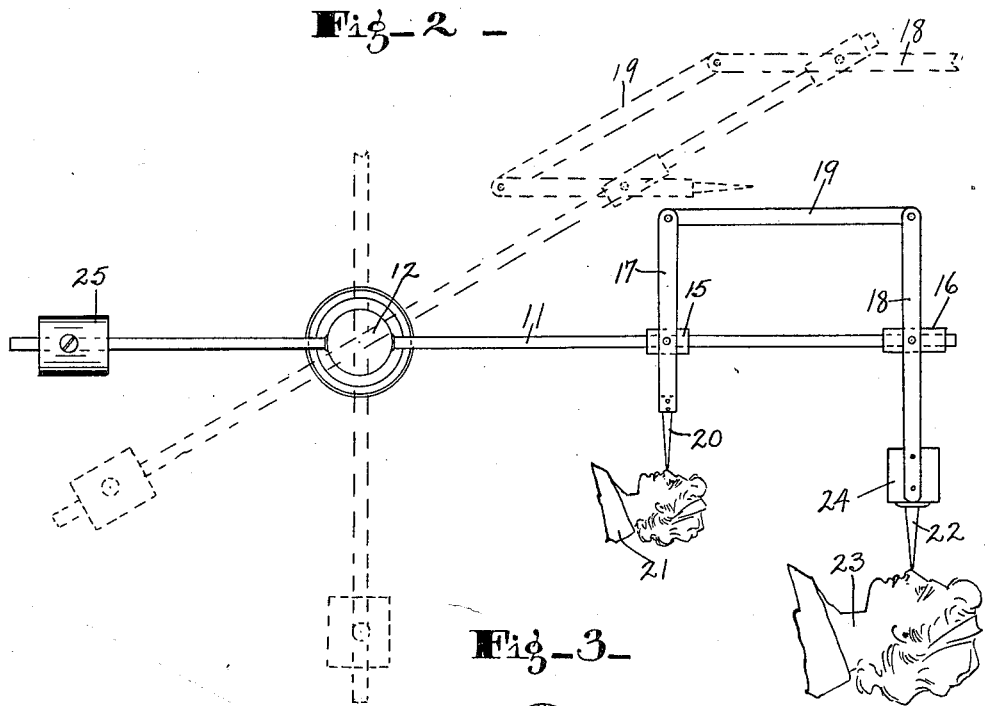
WITNESSES:
G. H. Boink
O. M. McLaughlin
INVENTOR.
Charles W. Conger.
BY
V. H. Lockwood.
ATTORNEY.

UNITED STATES PATENT OFFICE.

CHARLES W. CONGER, OF INDIANAPOLIS, INDIANA.

PATTERN-MACHINE.

1,013,130.　　　　Specification of Letters Patent.　　Patented Jan. 2, 1912.

Application filed January 30, 1911. Serial No. 605,404.

*To all whom it may concern:*

Be it known that I, CHARLES W. CONGER, a citizen of the United States, and a resident of Indianapolis, county of Marion, and State of Indiana, have invented a certain useful Pattern-Machine; and I do hereby declare that the following is a full, clear, and exact description thereof, reference being had to the accompanying drawings.

The object of this invention is to provide an improved mechanism for reproducing surfaces either by way of carving, engraving, painting or otherwise in which the tracing and reproducing points may be readily adapted to all sorts of irregularities of the surface being reproduced. The tracing point can be made to travel over depressions, and elevations and in vertical, horizontal or oblique directions and correctly transmit the same or proportionate travel to the reproducing point.

The nature of the invention will be understood from the accompanying drawings and the following description and claims.

In the drawings Figure 1 is an elevation of one form of the device showing the alternate position of parts by dotted lines. Fig. 2 is a plan view of the same. Fig. 3 is a section on the line 3—3 of Fig. 1.

A stationary post 10 is provided with a bearing ball 12 mounted loosely in a socket in the upper end of said post so that said ball can oscillate or rotate in any direction. A shaft 11 is secured between its ends to said bearing ball, whereby it can be rotated and rocked in any direction. The shaft at one end carries two adjustable bearings 15 and 16 on which levers 17 and 18 are respectively pivoted between their ends. These levers at one end are connected by a connecting bar 19 pivoted to them. At its other end the lever 17 carries a tracing point 20 adapted to trace the contour or irregularities of the surface of an object 21. The other lever 18 carries a reproducing point 22 adapted to reproduce the object 21 in the form of the object 23. If the device be used for carving, the lever 18 carries an electric motor 24 for driving the reproducing point or tool 22. For painting or other sorts of reproducing a motor might not be necessary and the invention is not limited to the use of a motor. The shaft 11 is balanced by an adjustable weight 25 on the end opposite the end of the shaft which carries the levers 17 and 18. The invention is not limited to the positions of the levers 17 and 18 and weight 25, as the levers 17 and 18 may be located anywhere on the shaft 11 so long as they are connected by the bar 19 and the weight 25 is located where it may be necessary to balance the shaft to make it convenient for operation.

The operator handling or operating the device from the lever 17 can oscillate the levers in a plane parallel with the shaft to any desired extent and can rotate them and the shaft or revolve the shaft or give it a rocking movement. Hence, the tracing point 20 can, without difficulty or adjustment of the parts of the device, be moved, for instance, to any point on the head of the object 21 or to the side or back whether by way of depression or elevation or movement in any other direction. It can trace the eyes and eye sockets, the nose, the top, back and side of the head, the lips, the chin and the throat of the human figure and completely and accurately reproduce the same. Hence, this device is practically unlimited in its capability of movement or operation.

I claim as my invention:

1. An apparatus for reproducing surfaces including a shaft, means for mounting said shaft so that it can be rotated and moved to variable positions, levers pivotally mounted in bearings adjustable on said shaft, a connection between said levers, and tracing and reproducing points mounted in connection with the two levers respectively.

2. An apparatus for reproducing surfaces including tracing and reproducing points, levers in which said points are mounted, bearings on which said levers are pivotally mounted, a shaft on which said bearings are adjustable, pivotal connection between said levers, and a universal bearing in which said shaft is rotatably mounted between its ends, whereby the shaft may have rotary as well as other movement.

3. An apparatus for reproducing surfaces including tracing and reproducing points, parallel levers in which said points are mounted, bearings on which said levers are pivotally mounted, a shaft on which said bearings are adjustable, a pivotal connection between said levers, a support with a socket in the upper end thereof, and a ball bearing in said socket to which said shaft is secured between its ends.

4. An apparatus for reproducing surfaces including a shaft, a universal bearing for mounting the shaft between its ends, a pair of levers pivotally mounted on bearings adjustably mounted on one end of said shaft, a pivotal connection between said levers, tracing and reproducing points on said levers respectively, and an adjustable weight on the other end of the shaft for balancing the same.

In witness whereof, I have hereunto affixed my signature in the presence of the witnesses herein named.

CHARLES W. CONGER.

Witnesses:
O. M. McLaughlin,
G. H. Boink.